(12) United States Patent
Shin et al.

(10) Patent No.: US 12,202,344 B2
(45) Date of Patent: Jan. 21, 2025

(54) CONSOLE CONTROL DEVICE AND VEHICLE USING THE SAME

(71) Applicant: HYUNDAI MOBIS CO., LTD., Seoul (KR)

(72) Inventors: Ji Soo Shin, Yongin-si (KR); Tae Hun Kim, Seongnam-si (KR); Kyung Hoon Kim, Yongin-si (KR); Sung Joon Ahn, Seongnam-si (KR); Shin Jik Lee, Hwaseong-si (KR); Hyun Jun An, Gunpo-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/484,976

(22) Filed: Oct. 11, 2023

(65) Prior Publication Data

US 2024/0174083 A1  May 30, 2024

(30) Foreign Application Priority Data

Nov. 28, 2022  (KR) .................. 10-2022-0161810
Nov. 28, 2022  (KR) .................. 10-2022-0161811

(51) Int. Cl.
| | |
|---|---|
| B60K 35/00 | (2024.01) |
| G06F 3/02 | (2006.01) |
| G06F 3/0362 | (2013.01) |
| G06F 3/14 | (2006.01) |
| H01F 7/16 | (2006.01) |
| B60K 35/10 | (2024.01) |
| B60K 35/29 | (2024.01) |

(52) U.S. Cl.
CPC ............ B60K 35/00 (2013.01); G06F 3/0202 (2013.01); G06F 3/0362 (2013.01); G06F 3/1423 (2013.01); H01F 7/16 (2013.01); *B60K 35/10* (2024.01); *B60K 35/29* (2024.01); *B60K 2360/126* (2024.01); *B60K 2360/182* (2024.01); *B60K 2360/344* (2024.01)

(58) Field of Classification Search
CPC ........ B60K 35/00; B60K 35/29; B60K 35/10; B60K 2360/344; B60K 2360/182; B60K 2360/126; G06F 3/0202; G06F 3/0362; G06F 3/1423; H01F 7/16–17
See application file for complete search history.

(56) References Cited

U.S. PATENT DOCUMENTS

2017/0153718 A1\* 6/2017 Brown .................... B60K 35/10
2018/0107320 A1\* 4/2018 Im .......................... B60K 35/10

FOREIGN PATENT DOCUMENTS

KR           101527059      \*  6/2014

\* cited by examiner

*Primary Examiner* — Lisa S Landis
(74) *Attorney, Agent, or Firm* — NSIP Law

(57) ABSTRACT

Disclosed is a console operation device including a base plate, at least one solenoid disposed in the base plate, a guide rail disposed in front of the base plate, and a manipulator mounted on the guide rail to move on the guide rail, wherein the at least one solenoid includes a first magnet having a polarity, wherein the manipulator includes a second magnet having a polarity, wherein the manipulator is configured to be moved based on the polarities of the first and second magnets.

18 Claims, 21 Drawing Sheets

CONSOLE CONTROL DEVICE AND VEHICLE USING THE SAME

CROSS-REFERENCE TO RELATED APPLICATION(S)

This application claims priority under 35 U.S.C. § 119 to Korean Application No. 10-2022-0161810 filed on Nov. 28, 2022 and Korean Application No. 10-2022-0161811 filed on Nov. 28, 2022, in the Korean Intellectual Property Office, the entire disclosure of which is incorporated herein by reference for all purposes.

BACKGROUND

1. Field

Embodiments are applicable to vehicles in any field, and more specifically, to, for example, vehicles that support autonomous driving.

2. Discussion of Related Art

With the advent of autonomous vehicles, various studies have been conducted on how to improve occupant comfort. For example, it has been proposed to improve the visibility and convenience of occupants by moving the position of the display left/right or up/down depending on the driving mode. Also, in an autonomous driving mode, a retractable steering wheel has been proposed to allow an occupant to move more freely.

As the application of large screen takes up space inside, control buttons are being minimized and functions are being integrated. Although the main functions should be simple and intuitive to control, touch screen operation during driving causes great danger.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a console control device including a base plate, at least one solenoid disposed in the base plate, a guide rail disposed in front of the base plate, and a manipulator mounted on the guide rail to move on the guide rail, wherein the at least one solenoid includes a first magnet having a polarity, wherein the manipulator includes a second magnet having a polarity, wherein the manipulator is configured to be moved based on the polarities of the first and second magnets.

The at least one solenoid may include a linear type solenoid configured to rectilinearly reciprocate in response to an electrical signal, and a rotary type solenoid configured to rotationally reciprocate in response to an electrical signal.

The linear type solenoid may include a side solenoid configured to return the manipulator to a position.

In another general aspect, there is provided a console control device including a base plate, at least one actuator disposed within the base plate, a guide rail disposed in front of the base plate, and a manipulator mounted on the guide rail to move on the guide rail, wherein the at least one actuator includes a first magnet having a polarity, wherein the manipulator includes a second magnet having a polarity, wherein the manipulator is configured to be moved based on the polarities of the first and second magnets.

The at least one actuator may rotate about an axis and linearly moves back and forth, in response to an electrical signal to control a variable section.

In another general aspect, there is provided a vehicle including a large-screen display disposed in a cockpit of the vehicle, a secondary display disposed on a side of the large-screen display, a console control device configured to control the large-screen display, and a controller configured to receive an operation signal from the console control device and control a graphical user interface (GUI) output to the large-screen display, wherein the console control device includes a base plate, at least one solenoid or at least one actuator disposed within the base plate, a guide rail disposed in front of the base plate, and a manipulator mounted on the guide rail to move on the guide rail, wherein the at least one solenoid or the at least one actuator includes a first magnet having a polarity, wherein the manipulator includes a second magnet having a polarity, wherein the manipulator is movable based on the polarities of the first and second magnets.

The controller may be configured to receive position information about the manipulator based on movement of the manipulator, change a flexible graphical user interface (GUI) output to the large-screen display based on the position information, and change a control section of the manipulator based on the flexible GUI.

The controller may be configured to send a signal to the at least one solenoid based on the flexible GUI, in response to receiving an input for function extension through the manipulator.

The at least one solenoid may include a linear type solenoid or a rotary type solenoid, wherein the controller may be configured to control the linear type solenoid or the rotary type solenoid based on the signal sent to the solenoid based on the flexible GUI.

The controller may be configured to set an operation section of the manipulator according to the function extension, and determine whether a position of the manipulator exceeds the operation section.

The controller may be configured to regulate the position of the manipulator within the operation section, in response to the position of the manipulator being within the operation section.

The controller may be configured to change the polarity of the at least one solenoid positioned in a region beyond the operation section to an identical polarity to push the manipulator away from the position, in response to the position of the manipulator not being within the operation section.

The controller may be configured to operate a side solenoid located in a region beyond the operation section to push the manipulator away from the position, in response to the position of the manipulator not being within the operation section.

The controller may be configured to send a signal to the at least one actuator based on the flexible GUI, in response to receiving an input for function extension through the manipulator.

The controller may be configured to control the at least one actuator to move forward and backward based on the signal sent to the at least one actuator based on the flexible GUI.

The controller may be configured to set an operation section of the manipulator according to the function extension, and determine whether a position of the manipulator exceeds the operation section.

The controller may be configured to regulate the position of the manipulator within the operation section, in response to the position of the manipulator being within the operation section.

The controller may be configured to regulate the at least one actuator positioned in a region beyond the operation section to move backward, in response to the position of the manipulator not being within the operation section.

Other features and aspects will be apparent from the following detailed description, the drawings, and the claims.

Figure 1:
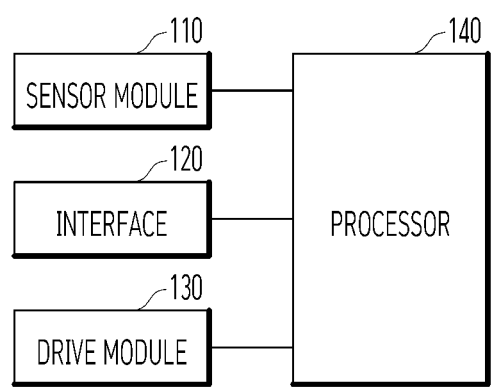
FIG. 1 schematically illustrates a configuration of a driving system of a vehicle according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, whenever any part is described as "including" any component, it is meant to be inclusive of other components, not exclusive of other components, unless explicitly stated otherwise.

As used herein, the term "vehicle" is assumed to be, but is not necessarily limited to, a vehicle used to transport passengers. It may include urban air mobility (UAM) and a bus.

FIG. 1 schematically illustrates a configuration of a driving system of a vehicle according to one embodiment of the present disclosure.

In one embodiment of the present disclosure, a vehicle may include a sensor module 110, an interface 120, a drive module 130, and a processor 140.

The sensor module 110 may include at least one sensor capable of recognizing conditions inside and/or outside the vehicle. The sensor module 110 may include, for example, a camera sensor, an infrared sensor, a radar sensor, a voice sensor, a temperature sensor, and a humidity sensor.

The interface 120 may include at least one interface to provide a user of the vehicle with various audiovisual data or information related or unrelated to the vehicle, and/or control tools for the vehicle or component(s) thereof. The interface 120 may include, for example, front display(s) provided for the occupant(s), and/or an acoustic device(s) provided for the occupant(s). The interface 120 may exchange signals with at least one electronic device in the vehicle in a wired or wireless manner. The interface 120 may convert an input by the user of the vehicle into an electrical signal and provide the signal to the processor 140.

The drive module 130 may physically drive and/or operate internal or external components of the vehicle based on the control of the processor 140. The drive module 130 may change, for example, the physical position(s) of the wheel(s), steering wheel(s), seat(s), and front display(s) of the vehicle.

The processor 140 may include at least one processor. The at least one processor in the processor 140 may be electrically connected to components (e.g., the sensor module, the interface, and the communicator (not shown)) of the vehicle to exchange signals and to control the components of the vehicle. The processor 140 may further include at least one memory (not shown). The at least one processor may be referred to as a controller, microcontroller, microprocessor, or microcomputer. The at least one processor may be implemented by hardware, firmware, software, or a combination thereof. For example, the at least one processor may include one or more application specific integrated circuits (ASICs), one or more digital signal processors (DSPs), one or more digital signal processing devices (DSPDs), one or more programmable logic devices (PLDs), or one or more field programmable gate arrays (FPGAs). The functions, procedures, proposals, and/or methods disclosed herein may be implemented using firmware or software, and the firmware or software may be implemented to include modules, procedures, and functions. Firmware or software configured to perform the functions, procedures, proposals, and/or methods disclosed herein may be included in at least one processor, or may be stored in at least one memory and executed by at least one processor. The features, procedures, proposals, and/or methods disclosed herein may be implemented using firmware or software in the form of code, instructions, and/or a set of instructions.

The processor 140 may generate control signals for the sensor module 110, the interface 120, and/or the drive module 130 based on electrical signals received from the sensor module 110 and/or the interface 120.

The at least one memory may be connected to the at least one processor and may store various kinds of information related to the operation of the at least one processor. For example, the at least one memory may store software code that includes instructions for performing some or all of the processes controlled by the at least one processor, or for performing the procedures and/or methods described/proposed below. The at least one memory may store commands, instructions, or programs, which, when executed, may cause the at least one processor operably connected to the at least one memory to perform operations according to one embodiment of the present disclosure.

The vehicle may further include a communicator. The communicator may include one or more transceivers, and may receive user data, control information, wireless signals/channels, etc. referred to in the functions, procedures, proposals, methods, and/or flowcharts of operation disclosed herein from one or more other devices via the one or more transceivers. For example, the one or more transceivers may be connected to the processor 140, and may transmit and/or receive wireless signals. For example, the at least one processor in the processor 140 may control the one or more transceivers to transmit user data, control information, or wireless signals to the at least one other device. Further, the processor 140 may control the one or more transceivers to receive user data, control information, or wireless signals from one or more other devices. Further, the one or more transceivers may be connected to one or more antennas. The one or more transceivers may be configured to transmit and/or receive user data, control information, wireless signals/channels, etc. to and/or from the other device(s) through the one or more antennas.

Figure 2:
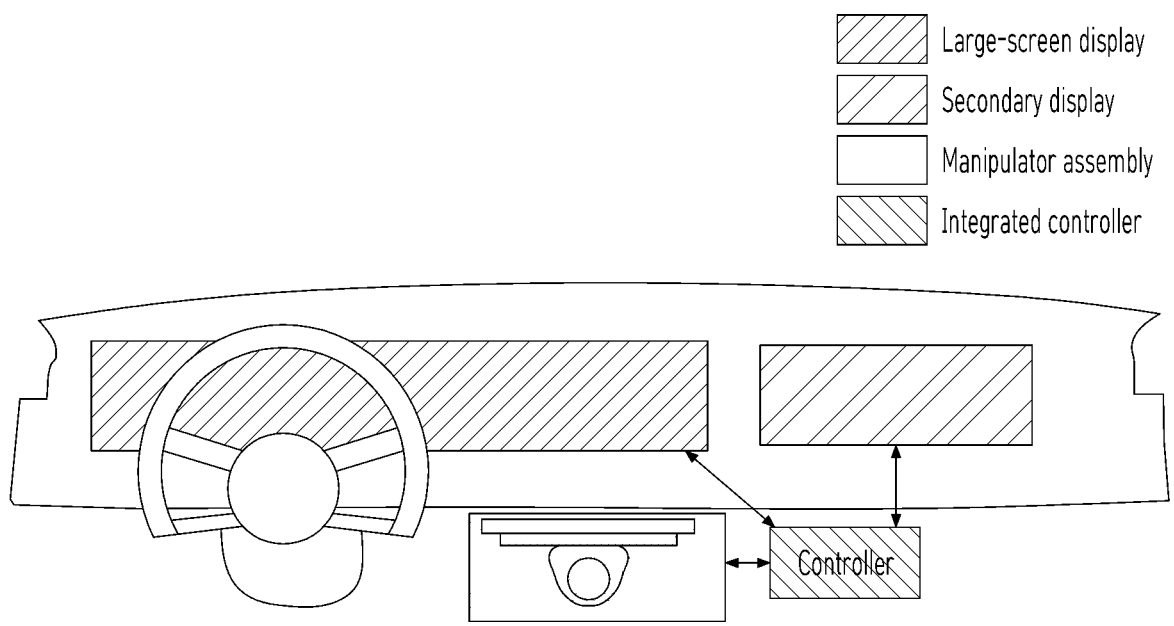
FIG. 2 illustrates a configuration of the interior of a mobile vehicle according to one embodiment of the present disclosure.

FIG. 2 illustrates a configuration of the interior of a mobile vehicle according to one embodiment of the present disclosure.

First, the vehicle according to the embodiment illustrated in FIG. 2 may include at least one camera configured to detect conditions inside said vehicle, a front display (head-up display (HUD)), a front display(s) configured to provide audiovisual information to the occupant(s), and a front display configured to provide the occupant(s) with status information about the vehicle and/or control over the gears, air conditioning, and/or seat(s) of the vehicle. The vehicle may also include a steering wheel, seat(s), and light(s).

A large-screen display according to one embodiment of the present disclosure may be disposed on one side of the driver's seat. If a front passenger seat is provided, the large-screen display may be disposed in the space between the driver's seat and the front passenger seat. A secondary display may be disposed on one side of the front passenger seat. If a driver's seat is provided, the secondary display may be disposed on a side of the large-screen display. The large-screen display and the secondary display may include a console control device.

Furthermore, the large-screen display according to the present embodiment may provide a manipulator for driving a vehicle, an indicator to indicate the status of a user, and an office screen.

The controller may receive signals from the position recognition sensor, the rotary type manipulator (hereinafter referred to as the manipulator), and the display and transmit commands thereto. The controller may receive an operation signal from a console control device to control a GUI output to a large-screen display.

Thus, the large-screen display may display all vehicle-related information on the screen by matching the manipulator and the flexible GUI. In addition, the secondary display may output all vehicle-related information to the screen by matching the manipulator and the flexible GUI.

Figure 3:
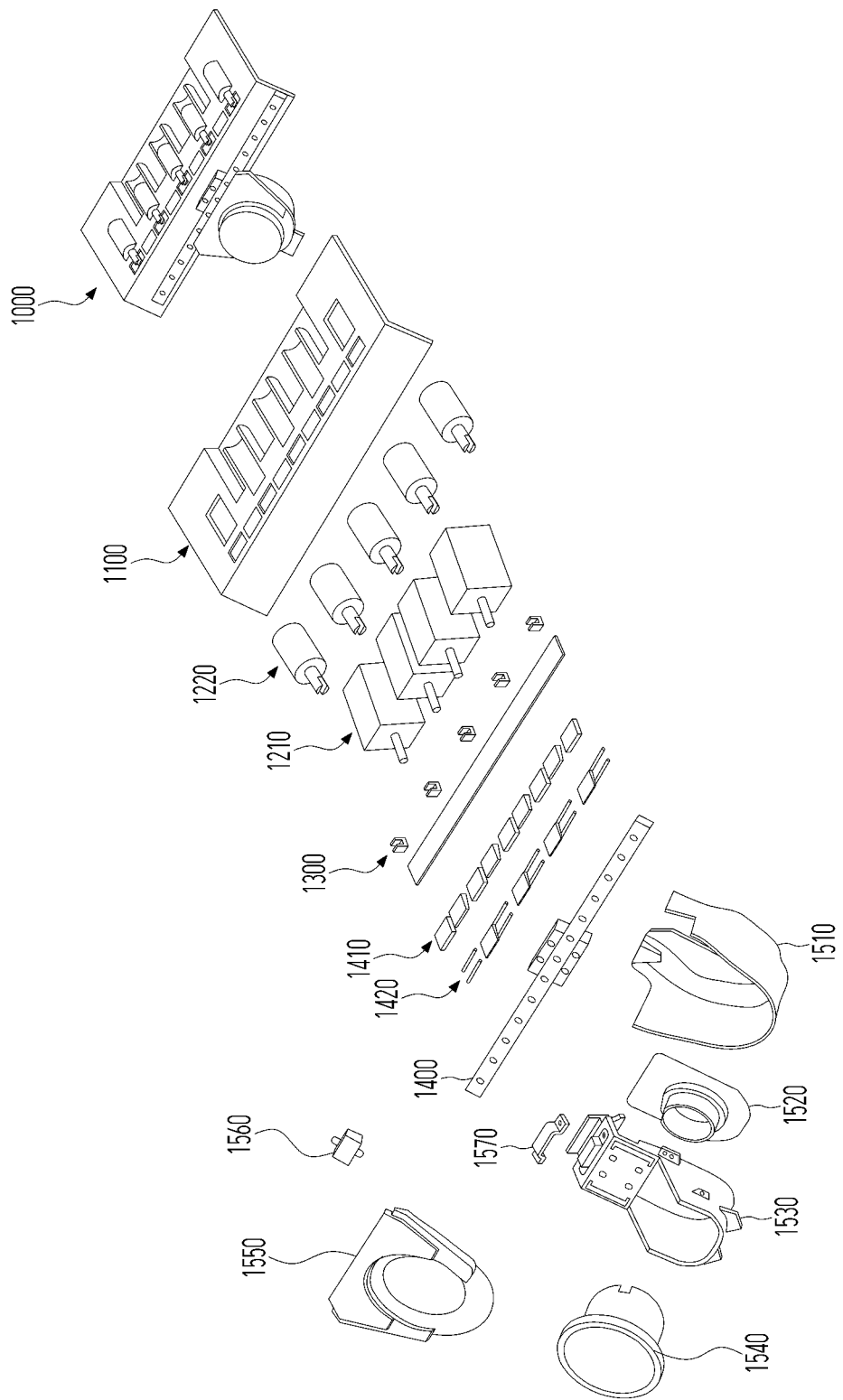
FIG. 3 is an exploded view illustrating a console control device employing solenoids according to one embodiment of the present disclosure.

FIG. 3 is an exploded view illustrating a console control device employing solenoids according to one embodiment of the present disclosure.

Referring to FIG. 3, a console control device employing solenoids according to an embodiment of the present disclosure may include a base plate 1100, a linear type solenoid 1210, a rotary type solenoid 1220, a position recognition sensor 1300, a guide rail 1400, and a manipulator 1500.

The base plate 1100 may be a basic base plate to which parts may be secured.

The linear type solenoid 1210, which makes a rectilinear reciprocating movement according to an electrical signal, and the rotary type solenoid 1220, which makes a rotary reciprocating movement according to an electrical signal, may be disposed on the base plate 1100.

The position recognition sensor 1300 may be configured to recognize a position of the manipulator 1500 when the manipulator 1500 is placed in front of the sensor and send a signal to the controller.

The manipulator 1500 may be mounted on the guide rail 1400. The manipulator 1500 may reciprocate from side to side on the rail. Inside the guide rail 1400, an ND magnet 1410 may be disposed by an adhesive 1420. The ND magnet 1410 may be mounted to the base plate 1100 or mounted after being coupled with a solenoid and may serve to match the polarity of a magnet mounted on the manipulator 1500 to facilitate movement of the manipulator 1500. The ND magnet 1410 may be a strongly magnetic component that utilizes N/S poles to facilitate movement of the manipulator 1500.

The manipulator 1500 may be operated as a rotary type and configured to send a signal corresponding to a selection to the controller. The manipulator 1500 may include a back cover 1510, a printed circuit board (PCB) 1520, a bracket 1530, a knob 1540, and a front housing 1550.

The manipulator 1500 may further include a proximity sensor 1560 configured to sense a distance from a hand or something else approaching the manipulator and send a corresponding signal. The manipulator 1500 may further include a knob magnet 1570 mounted on the bracket 1530 to facilitate movement of the manipulator 1500 by matching the polarity of magnets mounted on the guide rail or solenoids.

Figure 4:
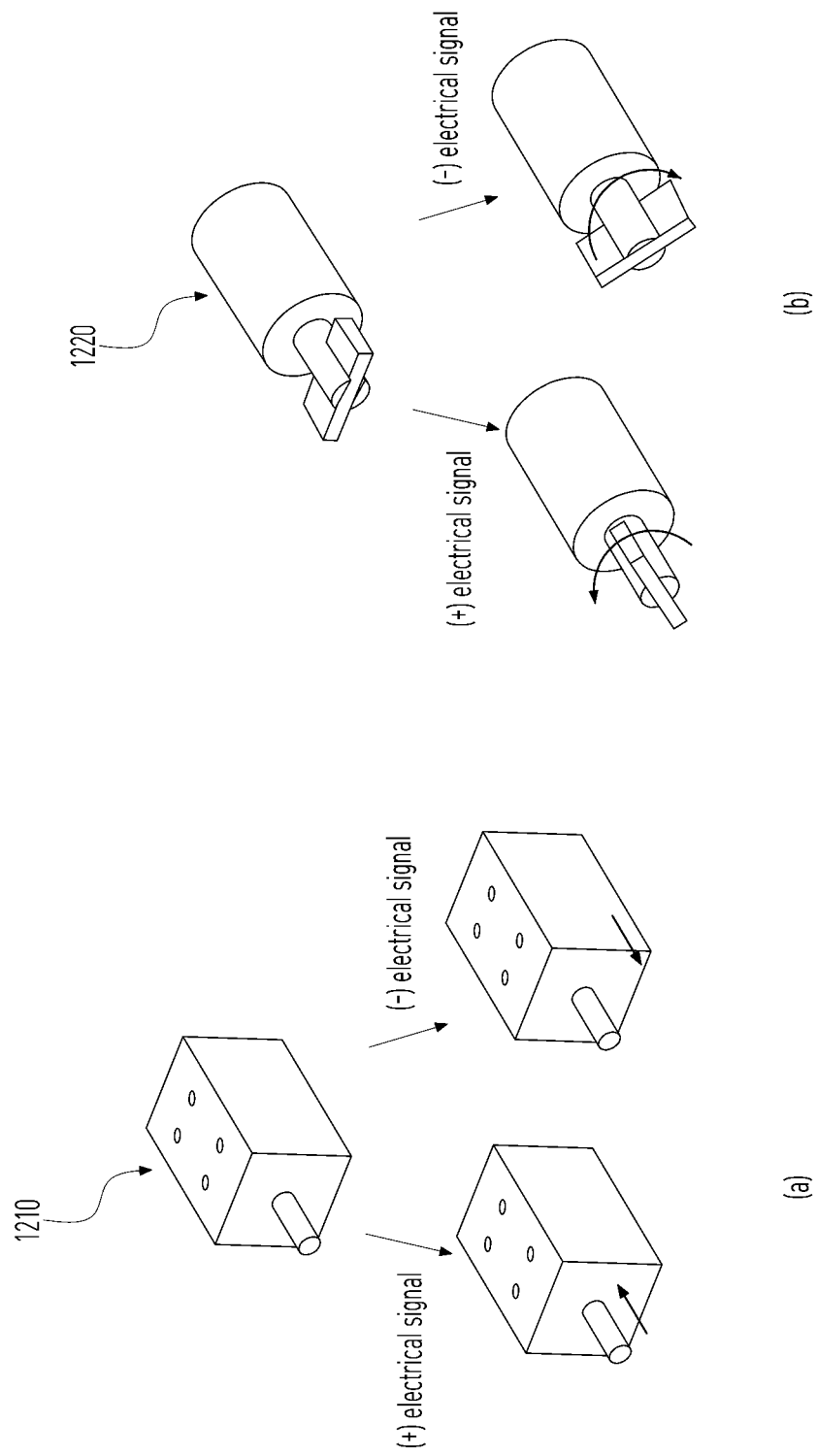
FIGS. 4 and 5 illustrate the operation of a console control device employing solenoids according to one embodiment of the present disclosure.
Figure 5:
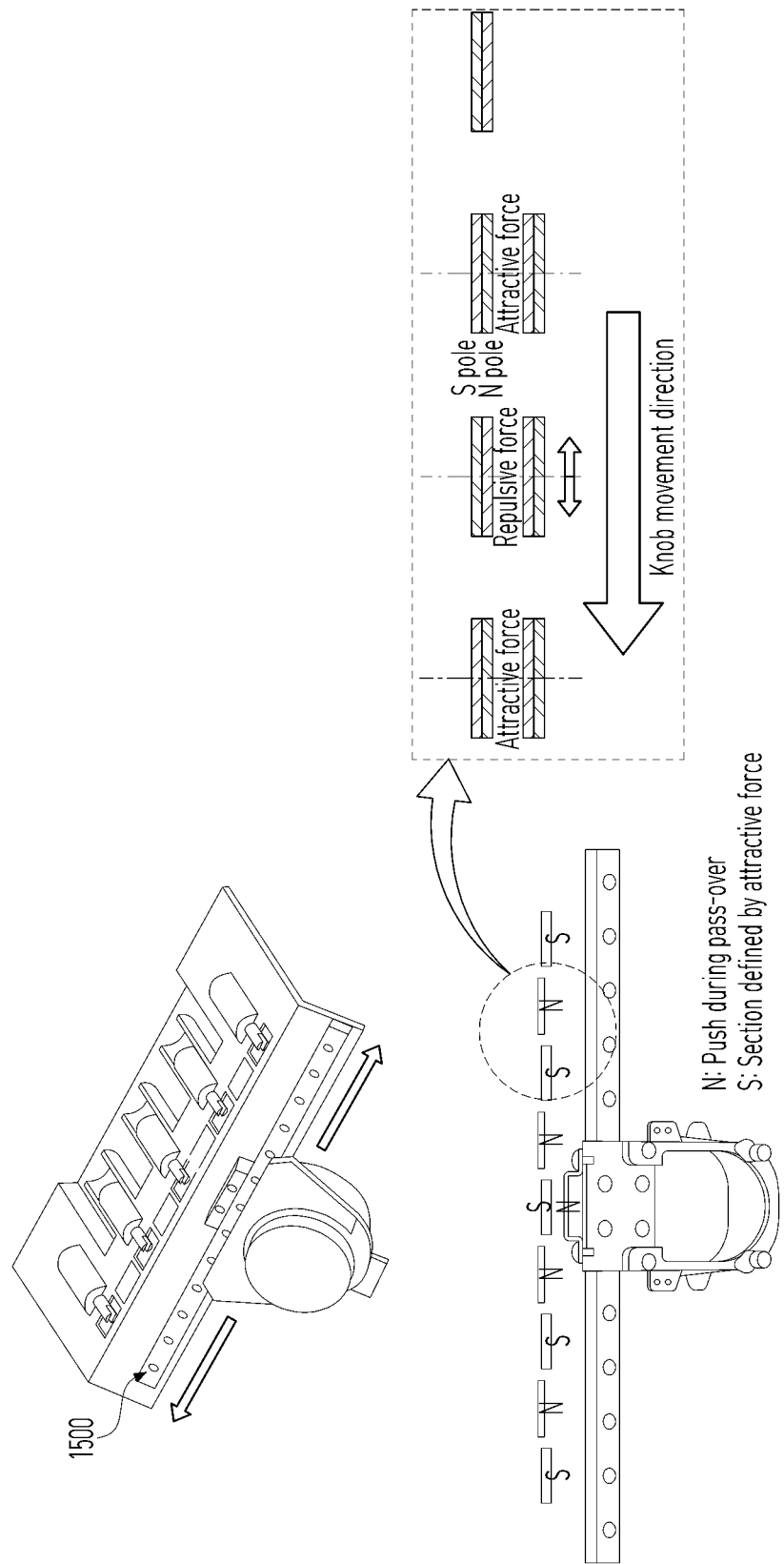

FIGS. 4 and 5 illustrate the operation of a console control device employing solenoids according to one embodiment of the present disclosure.

Referring to FIG. 4-(a), the linear type solenoid 1210 may be provided with a magnet at the end of the solenoid rod and may reciprocate in a rectilinear motion in response to an electrical signal to regulate the position of the manipulator 1500 with the magnet or to physically regulate the body of the manipulator 1500.

For example, when a positive (+) electrical signal is input to the linear type solenoid 1210, the magnet at the end of the solenoid rod may move backward. When a negative (−) electrical signal is input to the linear type solenoid 1210, the magnet at the end of the solenoid rod may move forward.

Referring to FIG. 4-(b), the rotary type solenoid 1220 may be provided with a magnet at the end of the solenoid rod, and may rotationally reciprocate in response to an electrical signal to regulate the position of the manipulator 1500 with the magnet and return the manipulator 1500 to its original position.

For example, when a positive (+) electrical signal is input to the rotary type solenoid 1220, the magnet at the end of the solenoid rod may rotate counterclockwise. When a negative (−) electrical signal is input to the rotary type solenoid 1220, the magnet at the end of the solenoid rod may rotate clockwise.

Referring to FIG. 5-(a), when the manipulator 1500 is moved from side to side by the guide rail, attractive and repulsive forces may be applied to the manipulator 1500 depending on the polarity of the ND magnet 1410 and the knob magnet 1570.

Referring to FIG. 5-(b), the ND magnet 1410 may be oriented to have alternating S and N poles, and the knob magnet 1570 may have polarity of either N or S pole.

For example, when the ND magnet 1410 has S polarity and the knob magnet 1570 has N polarity, the position of the manipulator 1500 may be fixed by an attractive force. Subsequently, when the knob is moved in one direction, it may pass over the N-pole region of the ND magnet 1410, may thus be pushed back by a repulsive force. When the knob passes over the center of the N-pole, it may move to the position of another S-pole of the ND magnet 1410.

Figure 6:
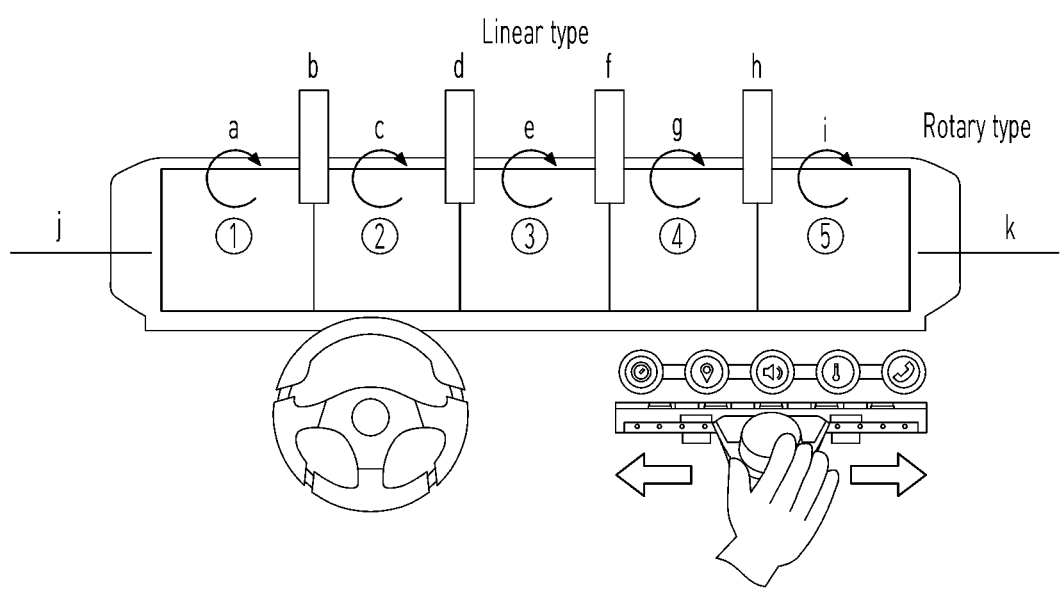
FIG. 6 illustrates the operation of a console control device employing solenoids according to one embodiment of the present disclosure.

FIG. 6 illustrates the operation of a console control device employing solenoids according to one embodiment of the present disclosure.

Referring to FIG. 6, assuming that five types of information can be displayed on the large-screen display, vehicle information may be controlled using the manipulator 1500. The vehicle information may include at least one of vehicle driving information (cluster), navigation (traffic information), multimedia, air-conditioning system, calls, or weather.

The manipulator 1500 may be linked to a flexible GUI of the vehicle information to control all items that are output to the display.

For example, the number of items that can be output to the display and selected using the manipulator 1500 may be five by default and may be changed. The number of screens and the number of sections of the manipulator 1500 may be changed depending on the flexible UI, and are not limited to this embodiment.

The manipulation region of the manipulator 1500 may be distinguished within the guide by five rotary type solenoids a, c, e, g, and i and four linear type solenoids b, d, f, and h. Accordingly, the section in which the manipulator 1500 can be operated within the guide may be divided into five regions ranging from a first region on the leftmost side to a fifth region on the rightmost side.

Further, the manipulator 1500 may be controlled to return to an original position by two linear type solenoids j and k.

Figure 7:
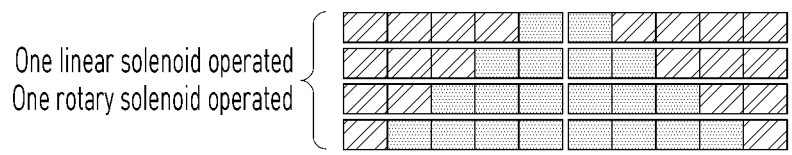
FIG. 7 illustrates display control of a console control device employing solenoids according to one embodiment of the present disclosure.
Figure 7:
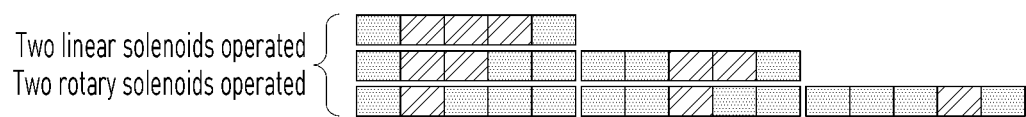

FIG. 7 illustrates display control of a console control device employing solenoids according to one embodiment of the present disclosure.

Referring to FIG. 7, when one linear solenoid and one rotary solenoid are operated, the manipulator 1500 may divide five regions of the display into a first region, first and second regions, first to third regions, first to fourth regions, second to fifth regions, third to fifth regions, fourth and fifth regions, or a fifth region for operation.

Furthermore, when the two linear solenoids and the two rotary solenoids are operated, the manipulator 1500 may divide the display into a second region, a third region, a fourth region, second and third regions, third and fourth regions, or second to fourth regions.

Figure 8:
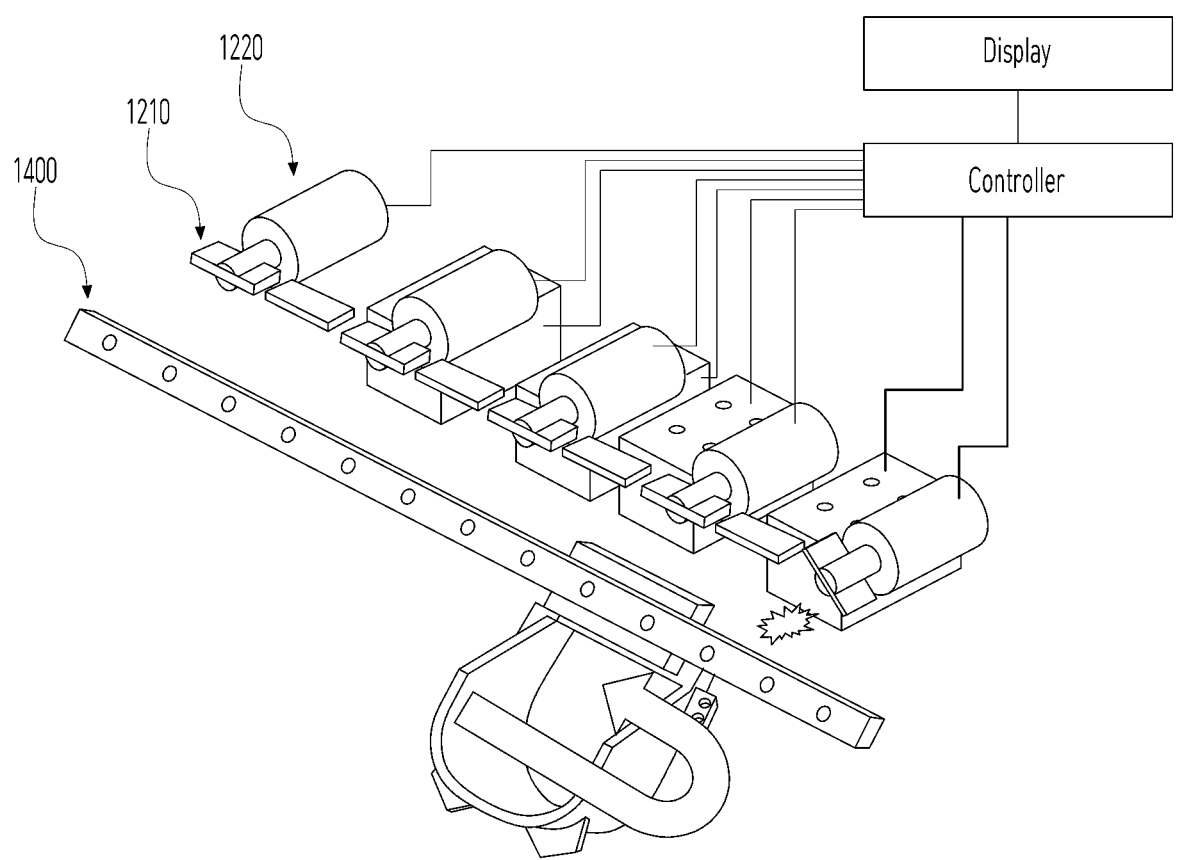
FIGS. 8 and 10 illustrate manipulator control of a console control device employing solenoids according to one embodiment of the present disclosure.
Figure 10:
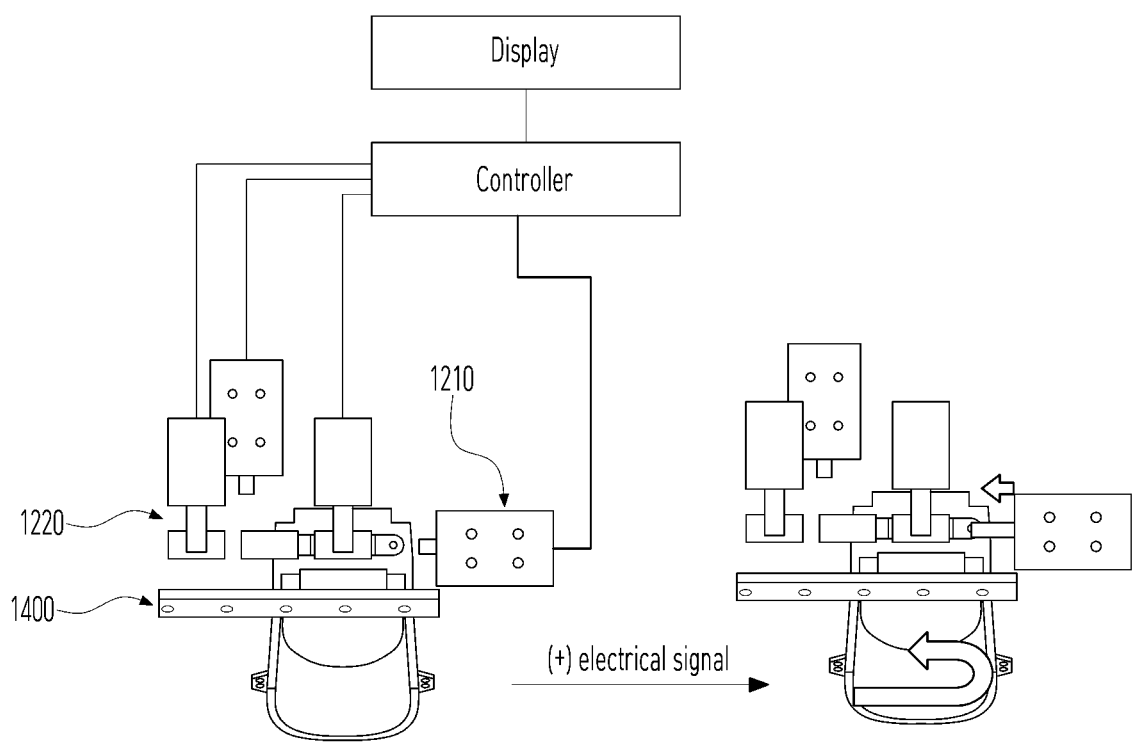

FIGS. 8 and 10 illustrate manipulator control of a console control device employing solenoids according to one embodiment of the present disclosure.

Figure 9:
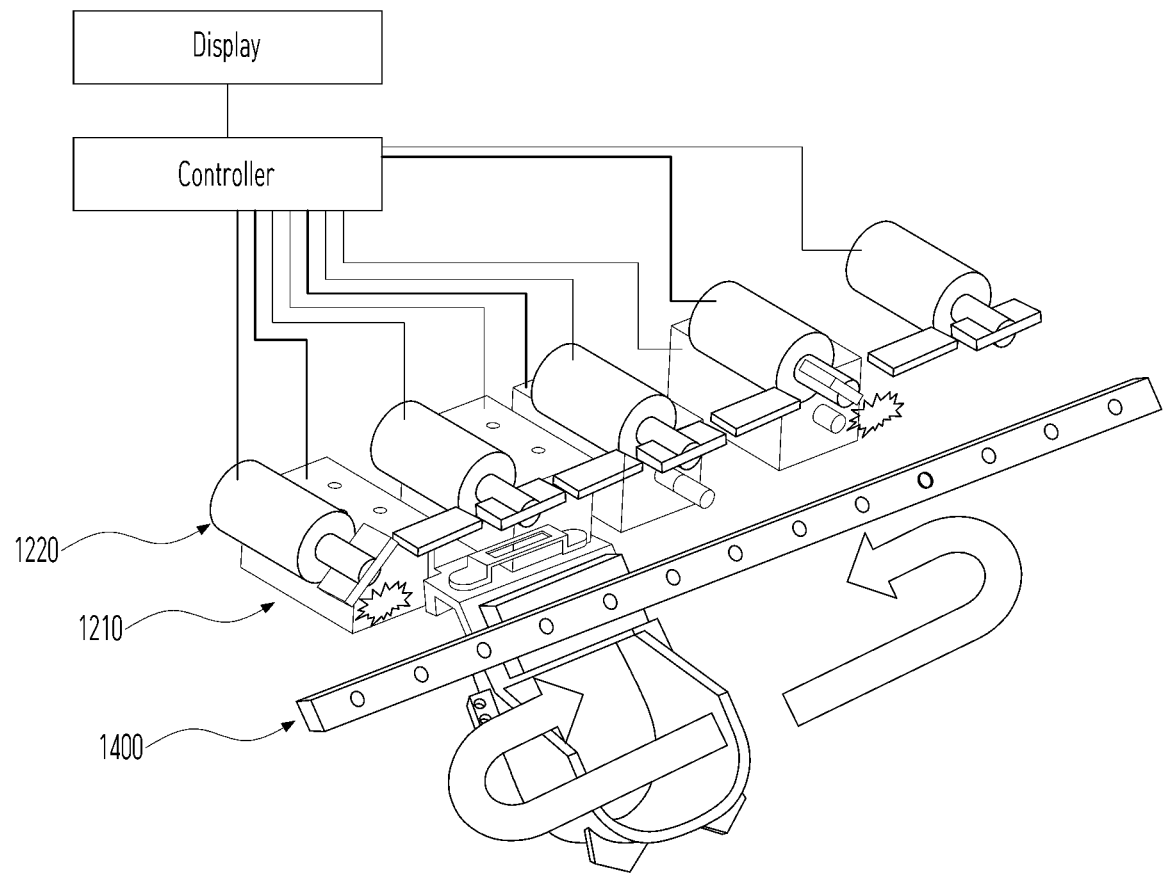

FIGS. 8 and 9 illustrate a case where the manipulator 1500 uses the section as a whole.

Referring to FIG. 8, the position of the manipulator 1500 may be regulated when the display is controlled according to the first to fourth regions. In the console control device, the rotary type solenoid g may be rotated and the linear type solenoid h may perform a rectilinear motion. Thereby, the manipulator 1500 may be regulated to move to the fifth region.

Referring to FIG. 9, when the display is controlled according to the second and third regions, the position of the manipulator 1500 may be regulated. In the console control device, the rotary type solenoid a and the rotary type solenoid g may be rotated, and the linear type solenoid b and the linear type solenoid f may perform a rectilinear motion. Thereby, the manipulator 1500 may be regulated to move to the first region to the left and to move to the fourth region to the right.

FIG. 10 illustrates a case where the manipulator 1500 that has been moved returns to a position.

Referring to FIG. 10, suppose that the manipulator 1500 is positioned in the fifth region. In this case, when a positive (+) signal is input to the linear type solenoid k located on one side, the linear type solenoid k may perform a rectilinear motion. Thereby, the manipulator 1500 may return from the fifth region to the fourth region.

Figure 11:
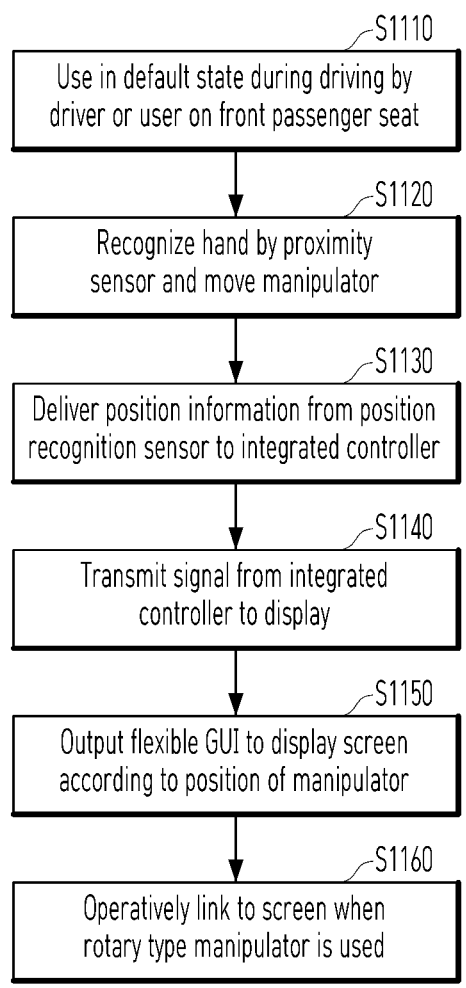
FIG. 11 is a flowchart illustrating a basic method of operating a console control device employing a solenoid according to one embodiment of the present disclosure.

FIG. 11 is a flowchart illustrating a basic method of operating a console control device employing solenoids according to one embodiment of the present disclosure.

Referring to FIG. 11, a driver or a user on the front passenger seat may use the console control device in a default state during driving (S1110).

After operation S1110, when the proximity sensor 1560 recognizes the user's hand or the manipulator 1500 is moved (S1120), the console control device may deliver position information about the manipulator from the position recognition sensor 1300 to the controller (S1130).

After operation S1130, the console control device may transmit a signal from the controller to the display (S1140).

After operation S1140, the console control device may output a flexible GUI to the display screen according to the position of the manipulator 1500 (S1150).

After operation S1150, the console control device may be operatively linked to the display screen in response to operation of the manipulator 1500 (S1160).

Figure 12:
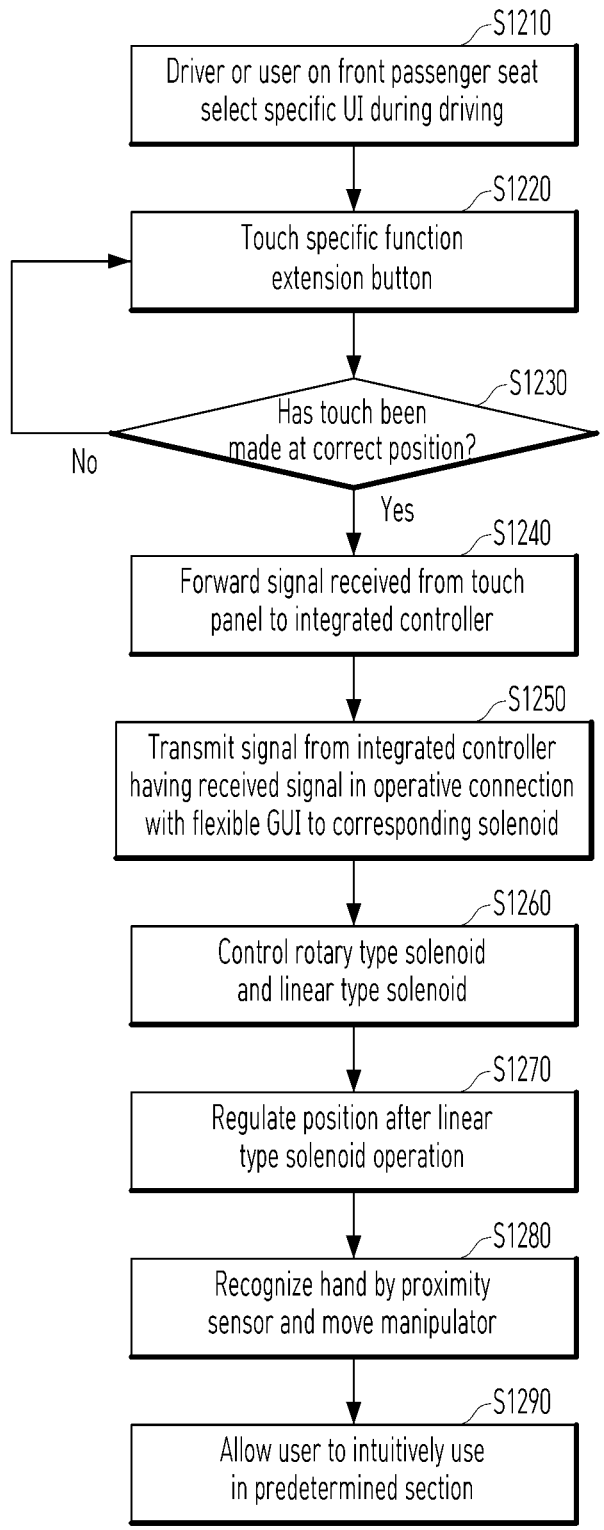
FIG. 12 is a flowchart illustrating a method of restrictively controlling a manipulator of a console control device employing solenoids according to one embodiment of the present disclosure.

FIG. 12 is a flowchart illustrating a method of restrictively controlling a manipulator of a console control device employing solenoids according to one embodiment of the present disclosure.

Referring to FIG. 12, a driver or a user on the front passenger seat may select a specific UI on the console control device during driving (S1210).

After operation S1210, when a specific function extension button is touched (S1220), the console control device may determine whether the touch has been made at the correct position (S1230).

After operation S1230, when the touch has been made at the correct position (Yes in S1230), the console control device may forward the signal received from the touch panel to the controller (S1240).

After operation S1240, the controller receiving the signal in operative connection with the flexible GUI from the console control device may transmit a signal to the corresponding solenoid (S1250).

After operation S1250, the console control device may control the rotary type solenoid and the linear type solenoid 1210 by a signal (S1260).

After operation S1260, the console control device may regulate the position of the solenoid after the rotary type/linear type operation (S1270). At this time, when the manipulator 1500 is moved beyond a preset control section, the console control device may push the manipulator 1500 with the same polarity magnet to restore the position, or push the manipulator 1500 with the straight movement of the side solenoid to restore the position.

After operation S1270, when a hand is recognized by the proximity sensor 1560 and the manipulator 1500 is moved (S1280), the console control device may allow the user to intuitively use the manipulator 1500 in a predetermined section (S1290).

Figure 13:
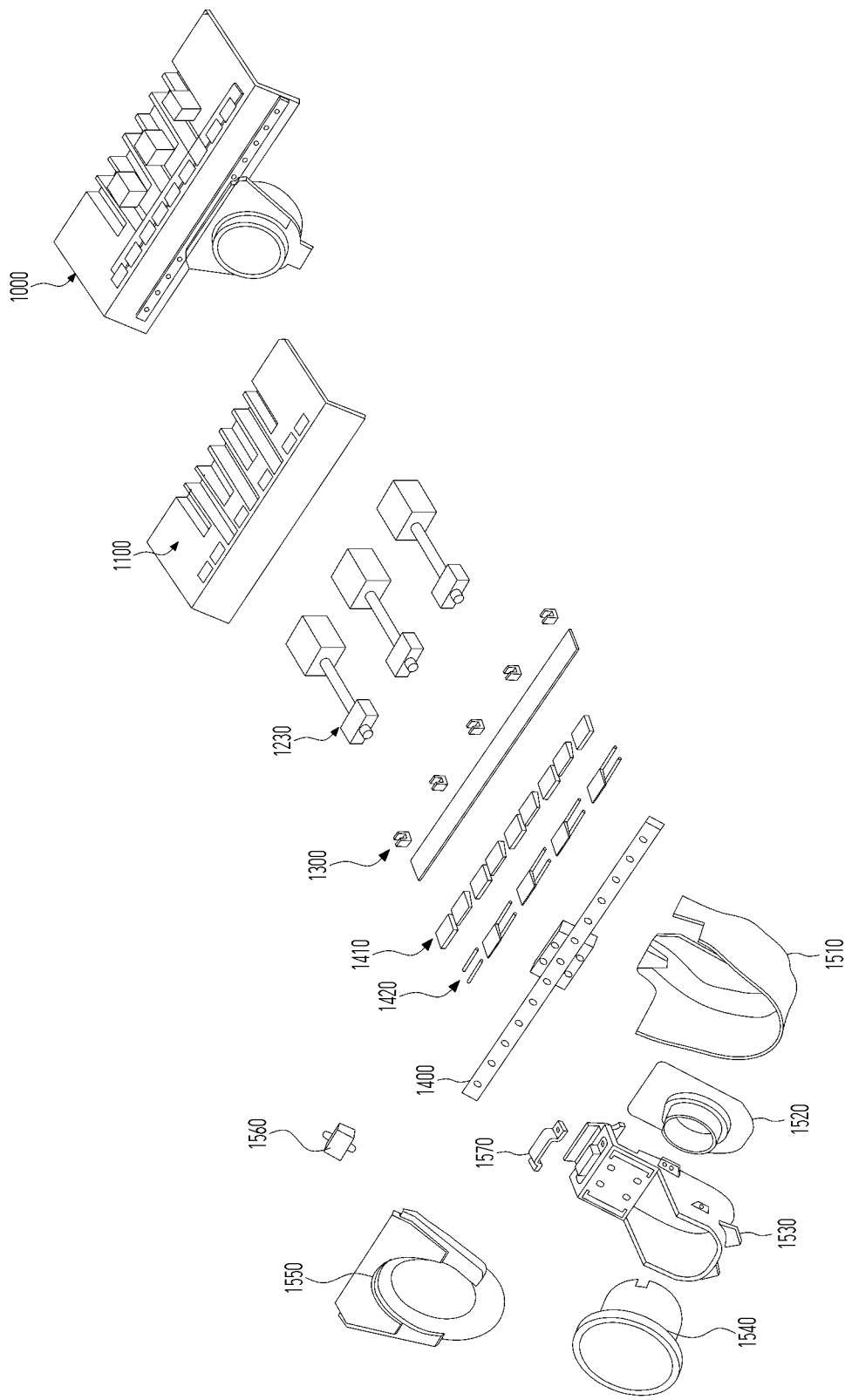
FIG. 13 is an exploded view illustrating a console control device employing an actuator according to one embodiment of the present disclosure.

FIG. 13 is an exploded view illustrating a console control device employing an actuator according to one embodiment of the present disclosure.

Referring to FIG. 13, a console control device employing an actuator according to one embodiment of the present disclosure may include a base plate 1100, an actuator 1230, a position recognition sensor 1300, a guide rail 1400, and a manipulator 1500.

The base plate 1100 may be a basic base plate to which parts may be secured.

On the base plate 1100, an actuator 1230 may be disposed that rotates about an axis in response to an electrical signal and moves the magnet linearly back and forth to define a variable section.

The position recognition sensor 1300 may be configured to recognize a position of the manipulator 1500 when the manipulator 1500 is placed in front of the sensor and send a signal to the controller.

The manipulator 1500 may be mounted on the guide rail 1400. The manipulator 1500 may reciprocate from side to side on the rail. Inside the guide rail 1400, an ND magnet 1410 may be disposed by an adhesive 1420. The ND magnet 1410 may be mounted to the base plate 1100 or mounted after being coupled with the actuator 1230 and may serve to match the polarity of a magnet mounted on the manipulator 1500 to facilitate movement of the manipulator 1500. The ND magnet 1410 may be a strongly magnetic component that utilizes N/S poles to facilitate movement of the manipulator 1500.

The manipulator 1500 may be operated as a rotary type and configured to send a signal corresponding to a selection to the controller. The manipulator 1500 may include a back cover 1510, a PCB 1520, a bracket 1530, a knob 1540, and a front housing 1550.

The manipulator 1500 may further include a proximity sensor 1560 configured to sense a distance from a hand or something else approaching the manipulator and send a corresponding signal. The manipulator 1500 may further include a knob magnet 1570 mounted on the bracket 1530 to facilitate movement of the manipulator 1500 by matching the polarity of magnets mounted on the guide rail or the actuator 1230.

Figure 14:
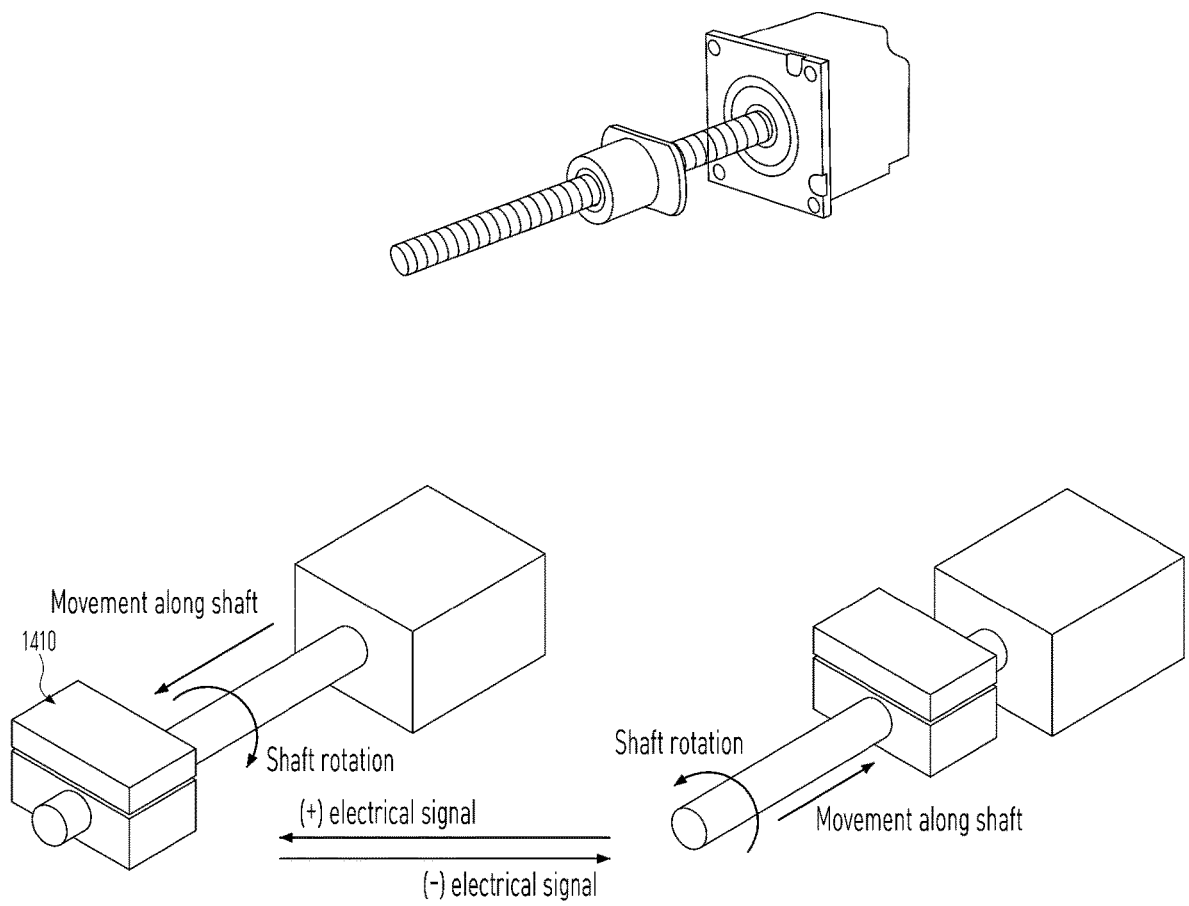
FIGS. 14 and 15 illustrate the operation of a console control device employing an actuator according to one embodiment of the present disclosure.
Figure 15:
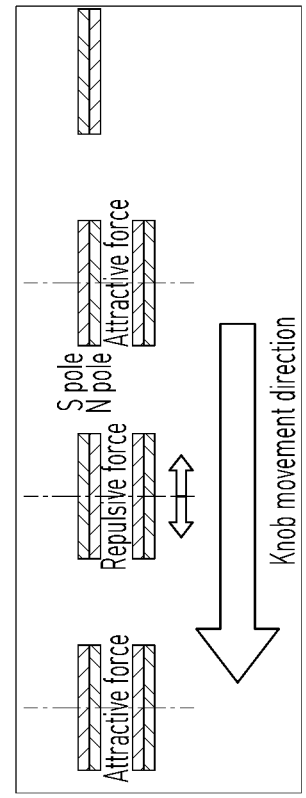
Figure 15:
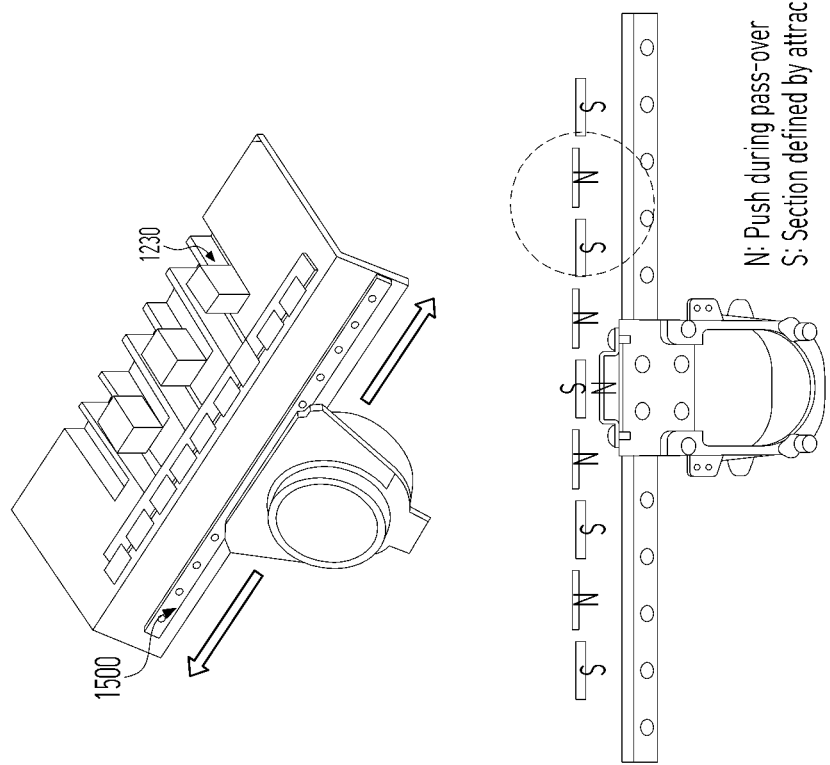

FIGS. 14 and 15 illustrate the operation of a console control device employing an actuator according to one embodiment of the present disclosure.

Referring to FIG. 14, the actuator 1230 may be provided with an ND magnet at the end of the rod of the actuator 1230 and may regulate the position of the manipulator 1500 or physically regulate the body of the manipulator 1500 through rotation of the shaft according to a linear reciprocating motion in response to an electrical signal.

For example, when a positive (+) electrical signal is input to the actuator 1230, the shaft of the actuator 1230 may rotate clockwise. Thus, the shaft may move forward, causing the magnet at the end of the rod to move forward. When a negative (−) electrical signal is input to the actuator 1230, the shaft of the actuator 1230 may rotate counterclockwise. Thus, the shaft may move backward, causing the magnet at the end of the rod to retract.

Referring to FIG. 15-(a), when the manipulator 1500 is moved from side to side by the guide rail, attractive and repulsive forces may be applied to the manipulator 1500 depending on the polarity of the ND magnet 1410 and the magnet of the manipulator 1500.

Referring to FIG. 15-(b), the ND magnet 1410 may be oriented to have alternating S and N poles, and the magnet of the manipulator 1500 may have polarity of either N or S pole.

For example, when the ND magnet 1410 has S polarity and the magnet of the manipulator 1500 has N polarity, the position of the manipulator 1500 may be fixed by an attractive force. Subsequently, when the knob is moved in one direction, it may pass over the N-pole region of the ND magnet 1410, may thus be pushed back by a repulsive force. When the knob passes over the center of the N-pole, it may move to the position of another S-pole of the ND magnet 1410.

Figure 16:
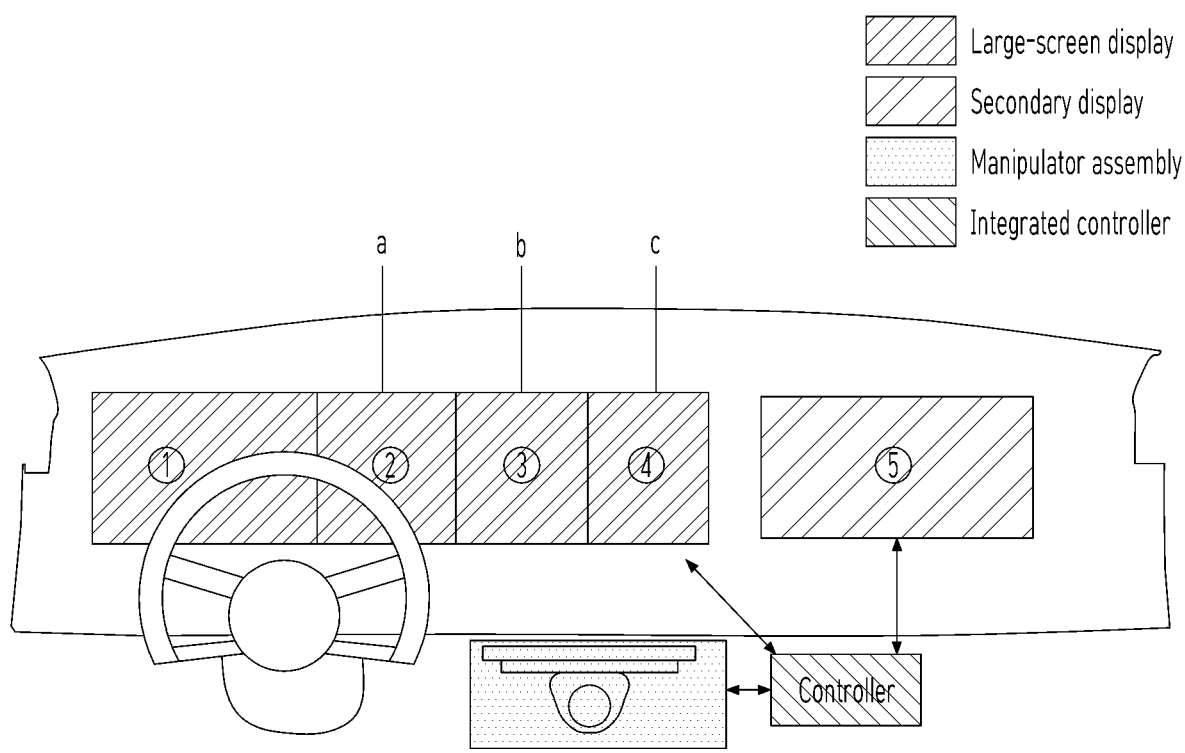
FIG. 16 illustrates the operation of a console control device employing an actuator according to one embodiment of the present disclosure.

FIG. 16 illustrates the operation of a console control device employing an actuator according to one embodiment of the present disclosure.

Referring to FIG. 16, assuming that five types of information can be displayed on the large-screen display, vehicle information may be controlled using the manipulator 1500. The vehicle information may include at least one of vehicle driving information (cluster), navigation (traffic information), multimedia, air-conditioning system, calls, or weather.

The manipulator 1500 may be linked to a flexible GUI of the vehicle information to control all items that are output to the display.

For example, the number of items that can be output to the display and selected using the manipulator 1500 may be four by default, and the number of items that can be output to the secondary display and selected using the manipulator 1500 is one by default. The number may be changed. The number of screens and the number of sections of the manipulator 1500 may be changed depending on the flexible UI, and are not limited to this embodiment.

The manipulation region of the manipulator 1500 may be distinguished within the guide by the three actuators a, b, and c. Accordingly, the section where the manipulator 1500 can be operated within the guide may be divided into five areas, four regions from a first region on the leftmost side of the large-screen display to a fourth region on the rightmost side, and one secondary display region.

Figure 17:
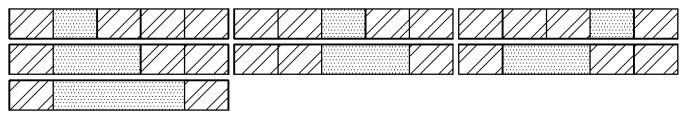
FIG. 17 illustrates display control of a console control device employing an actuator according to one embodiment of the present disclosure.

FIG. 17 illustrates display control of a console control device employing an actuator according to one embodiment of the present disclosure.

Referring to FIG. 17, the use of five screens may be an operational method for using at least two screens in relation to operation of the manipulator 1500.

Figure 18:
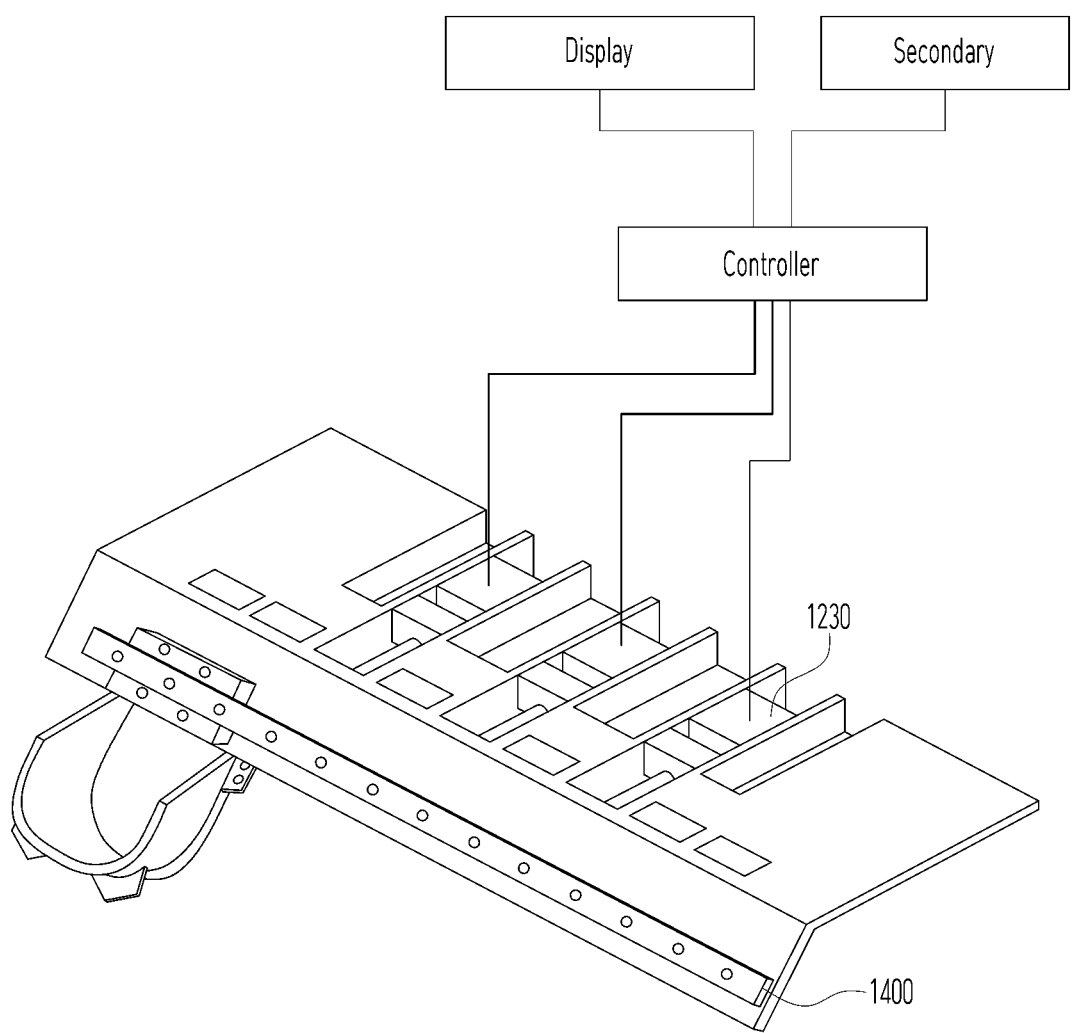
FIGS. 18 and 19 illustrate manipulator control of a console control device employing an actuator according to one embodiment of the present disclosure.
Figure 19:
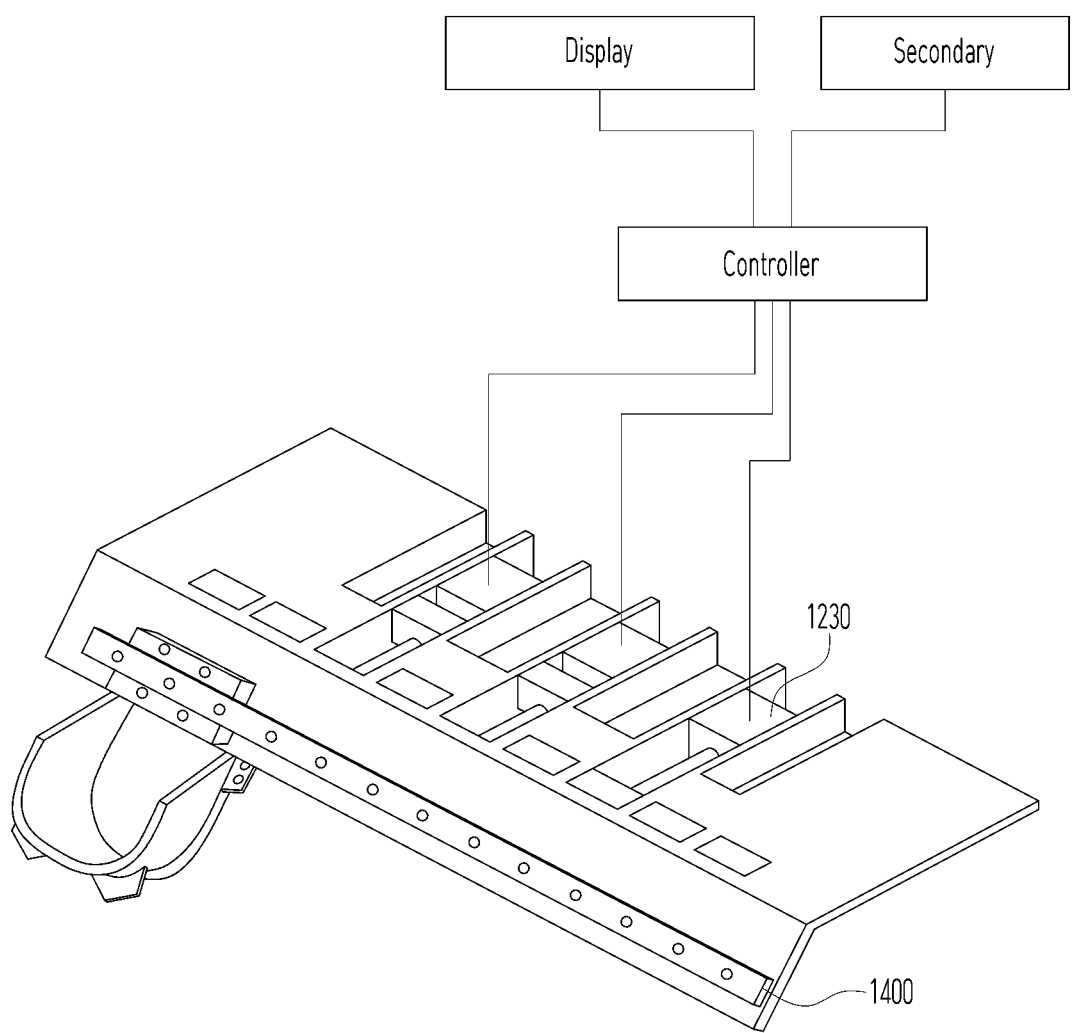

The manipulator 1500 may divide the five regions of the display into a first region and third to fifth regions, into first and second regions and fourth and fifth regions, into first and third regions and a fifth region, into first and fourth to fifth regions, into first and second regions and a fifth region, into a first region and fourth to fifth regions, or into a first region and a fifth region for operation FIGS. 18 and 19 illustrate manipulator control of a console control device employing an actuator according to one embodiment of the present disclosure.

FIGS. 18 and 19 illustrate a case where the manipulator 1500 uses the section as a whole.

Referring to FIG. 18, when the display is controlled according to the first region and the fourth and fifth regions, the intermediate regions is removed and only the outer regions are used.

The console control device may control the actuator a to retract, the actuator b to retract, and the actuator c to move forward. Accordingly, the manipulator 1500 may control the first region and the fourth region of the large-screen display, and may control the fifth region of the secondary display.

Referring to FIG. 19, when the display is controlled according to the first region and the fifth region, the intermediate regions are removed and only the outer regions are used.

The console control device may control the actuator a to retract, the actuator b to retract, and the actuator c to retract. Accordingly, the manipulator 1500 may control the first region of the large-screen display and the fifth region of the secondary display.

Figure 20:
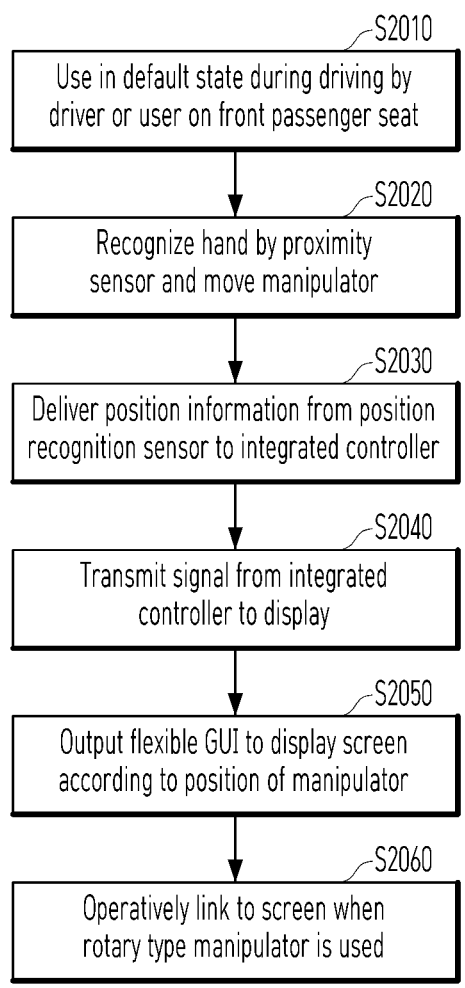
FIG. 20 is a flowchart illustrating a basic method of operating a console control device employing solenoids according to one embodiment of the present disclosure.

FIG. 20 is a flowchart illustrating a basic method of operating a console control device employing solenoids according to one embodiment of the present disclosure.

Referring to FIG. 20, a driver or a user on the front passenger seat may use the console control device in a default state during driving (S2010).

After operation S2010, when the proximity sensor recognizes the user's hand or the manipulator 1500 is moved (S2020), the console control device may deliver position information from the position recognition sensor to an integrated controller (S2030).

After operation S2030, the console control device may cause the integrated controller to transmit a signal to the display (S2040).

After operation S2040, the console control device may transmit a flexible GUI to the display screen according to the position of the manipulator 1500 (S2050).

After operation S2050, the console control device may be operatively linked to the display screen in response to operation of the manipulator 1500 (S2060).

Figure 21:
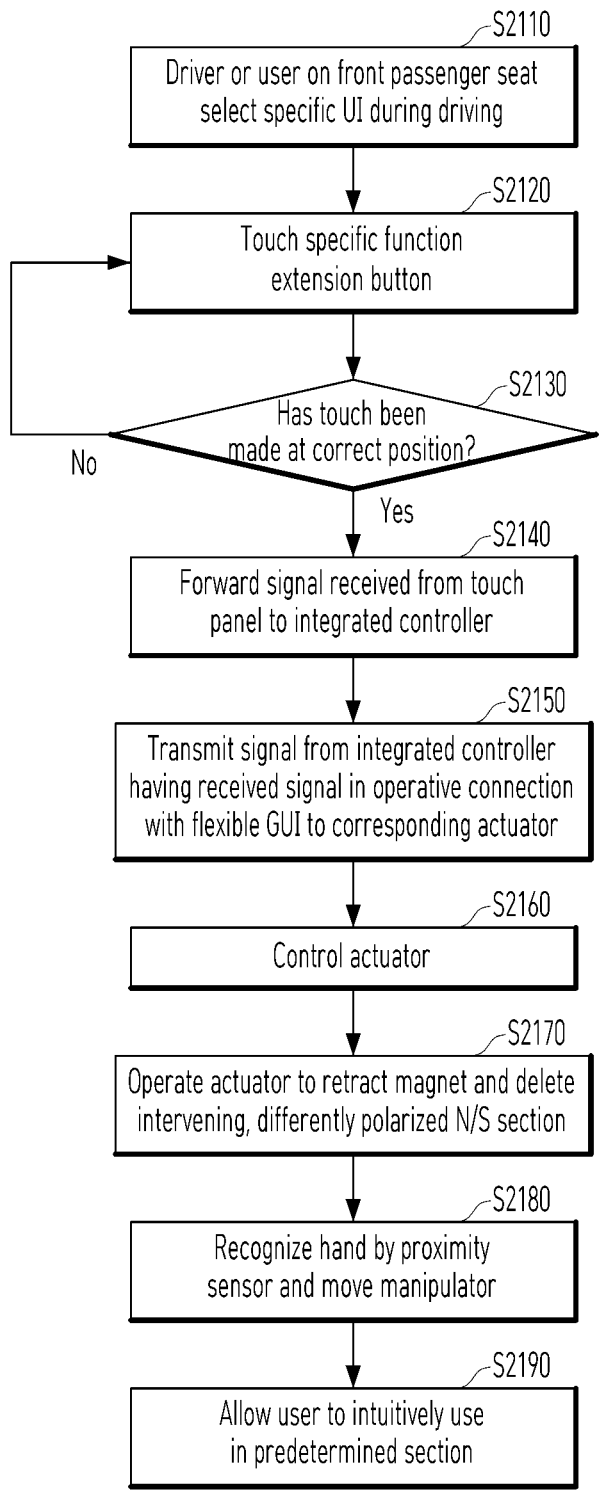
FIG. 21 is a flowchart illustrating a method of restrictively controlling a manipulator of a console control device employing an actuator according to one embodiment of the present disclosure.

FIG. 21 is a flowchart illustrating a method of restrictively controlling a manipulator of a console control device employing an actuator according to one embodiment of the present disclosure.

Referring to FIG. 21, a driver or a user on the front passenger seat may select a specific UI on the console control device during driving (S2110).

After operation S2110, when a specific function extension button is touched (S2120), the console control device may determine whether the touch has been made at the correct position (S2130).

After operation S2130, when the touch has been made at the correct position (Yes in S2130), the console control device may forward the signal received from the touch panel to the integrated controller (S2140).

After operation S2140, the integrated controller receiving the signal in operative connection with the flexible GUI from the console control device may transmit a signal to the corresponding actuator 1230 (S2150).

After operation S2150, the console control device may control the rotary type actuator 1230 the linear type actuator 1230 by a signal (S2160).

After operation S2160, the console control device may operate the actuator 1230 to retract the magnet and delete the intervening, differently polarized N/S section (S2170).

After operation S2170, when a hand is recognized by the proximity sensor and the manipulator 1500 is moved (S2180), the console control device may allow the user to intuitively use the manipulator 1500 in a predetermined section (S2190).

To address the problems described above, one embodiment of the present disclosure provides a technology for controlling a variable display and a manipulator in conjunction with a flexible GUI of an autonomous vehicle.

According to embodiments of the present disclosure as described above, multiple displays may be employed in a vehicle, or user convenience in a vehicle capable of autonomous driving may be enhanced, and functions may be assisted in driving situations. Thereby, the risk of accidents may be reduced.

The console control device and other computing apparatuses, electronic devices, processors, and other components described herein with respect to FIGS. 1-21 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A console control device comprising:
a base plate;
at least one solenoid disposed in the base plate;
a guide rail disposed in front of the base plate; and
a manipulator mounted on the guide rail to move on the guide rail,
wherein the at least one solenoid comprises a first magnet having a polarity,
wherein the manipulator comprises a second magnet having a polarity, wherein the manipulator is configured to be moved based on the polarities of the first and second magnets.

2. The console control device of claim 1, wherein the at least one solenoid comprises:
a linear type solenoid configured to rectilinearly reciprocate in response to an electrical signal; and
a rotary type solenoid configured to rotationally reciprocate in response to an electrical signal.

3. The console control device of claim 2, wherein the linear type solenoid comprises a side solenoid configured to return the manipulator to a position.

4. A console control device comprising:
a base plate;
at least one actuator disposed within the base plate;
a guide rail disposed in front of the base plate; and
a manipulator mounted on the guide rail to move on the guide rail,
wherein the at least one actuator comprises a first magnet having a polarity,
wherein the manipulator comprises a second magnet having a polarity,
wherein the manipulator is configured to be moved based on the polarities of the first and second magnets.

5. The console control device of claim 4, wherein the at least one actuator rotates about an axis and linearly moves back and forth in response to an electrical signal to control a variable section.

6. A vehicle comprising:
a large-screen display disposed in a cockpit of the vehicle;
a secondary display disposed on a side of the large-screen display;
a console control device configured to control the large-screen display; and
a controller configured to receive an operation signal from the console control device and control a graphical user interface (GUI) output to the large-screen display,
wherein the console control device comprises:
a base plate;
at least one solenoid or at least one actuator disposed within the base plate;
a guide rail disposed in front of the base plate; and
a manipulator mounted on the guide rail to move on the guide rail,
wherein the at least one solenoid or the at least one actuator comprises a first magnet having a polarity,
wherein the manipulator comprises a second magnet having a polarity,
wherein the manipulator is movable based on the polarities of the first and second magnets.

7. The vehicle of claim 6, wherein the controller is further configured to:
receive position information about the manipulator based on movement of the manipulator;
change a flexible graphical user interface (GUI) output to the large-screen display based on the position information, and
change a control section of the manipulator based on the flexible GUI.

8. The vehicle of claim 7, wherein the controller is further configured to send a signal to the at least one solenoid based on the flexible GUI, in response to receiving an input for function extension through the manipulator.

9. The vehicle of claim 8, wherein the at least one solenoid comprises a linear type solenoid or a rotary type solenoid,
wherein the controller is further configured to control the linear type solenoid or the rotary type solenoid based on the signal sent to the solenoid based on the flexible GUI.

10. The vehicle of claim 8, wherein the controller is further configured to:
set an operation section of the manipulator according to the function extension; and
determine whether a position of the manipulator exceeds the operation section.

11. The vehicle of claim 10, wherein the controller is further configured to regulate the position of the manipulator within the operation section, in response to the position of the manipulator being within the operation section.

12. The vehicle of claim 10, wherein the controller is further configured to change the polarity of the at least one solenoid positioned in a region beyond the operation section to an identical polarity to push the manipulator away from the position, in response to the position of the manipulator not being within the operation section.

13. The vehicle of claim 10, wherein the controller is further configured to operate a side solenoid located in a region beyond the operation section to push the manipulator away from the position, in response to the position of the manipulator not being within the operation section.

14. The vehicle of claim 7, wherein the controller is further configured to send a signal to the at least one actuator based on the flexible GUI, in response to receiving an input for function extension through the manipulator.

15. The vehicle of claim 14, wherein the controller is further configured to control the at least one actuator to move forward and backward based on the signal sent to the at least one actuator based on the flexible GUI.

16. The vehicle of claim 15, wherein the controller is further configured to:
set an operation section of the manipulator according to the function extension; and
determine whether a position of the manipulator exceeds the operation section.

17. The vehicle of claim 16, wherein the controller is further configured to regulate the position of the manipulator within the operation section, in response to the position of the manipulator being within the operation section.

18. The vehicle of claim 16, wherein the controller is further configured to regulate the at least one actuator positioned in a region beyond the operation section to move backward, in response to the position of the manipulator not being within the operation section.

* * * * *